(12) United States Patent
Kanda

(10) Patent No.: US 11,537,163 B2
(45) Date of Patent: Dec. 27, 2022

(54) INFORMATION DISPLAY APPARATUS, INFORMATION DISPLAY SYSTEM, INFORMATION DISPLAY METHOD, AND PROGRAM

(71) Applicant: JVCKENWOOD CORPORATION, Yokohama (JP)

(72) Inventor: Shigetoshi Kanda, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 203 days.

(21) Appl. No.: 16/886,725

(22) Filed: May 28, 2020

(65) Prior Publication Data

US 2020/0293090 A1 Sep. 17, 2020

Related U.S. Application Data

(63) Continuation of application No. PCT/JP2019/016703, filed on Apr. 18, 2019.

(30) Foreign Application Priority Data

Aug. 3, 2018 (JP) .............................. JP2018-146803

(51) Int. Cl.
*G06F 1/16* (2006.01)
*H02J 50/10* (2016.01)
(Continued)

(52) U.S. Cl.
CPC ............ *G06F 1/1632* (2013.01); *B60K 35/00* (2013.01); *H02J 7/00034* (2020.01);
(Continued)

(58) Field of Classification Search
CPC . G06F 1/1632; B60K 35/00; B60K 2370/152; B60K 2370/164;
(Continued)

(56) References Cited

U.S. PATENT DOCUMENTS

2015/0177896 A1\* 6/2015 Chun ..................... B60K 37/06
345/174
2016/0276865 A1\* 9/2016 Pike ........................ H02J 7/025

FOREIGN PATENT DOCUMENTS

| JP | 2009-274676 A | 11/2009 |
| JP | 2010-130729 A | 6/2010 |
| JP | 2017-169377 A | 9/2017 |

\* cited by examiner

*Primary Examiner* — Eugene Yun
(74) *Attorney, Agent, or Firm* — Procopio, Cory, Hargreaves & Savitch LLP

(57) ABSTRACT

An information display apparatus according to an embodiment includes a first display unit configured to display information, a placement part including a noncontact charging unit configured to charge the placed portable terminal apparatus, an orientation determination unit configured to determine an orientation of the placed portable terminal apparatus, a first display control unit, and a charging control unit. The charging control unit controls the noncontact charging unit so as to perform a process for charging the portable terminal apparatus when the portable terminal apparatus is placed on the placement part. The first display control unit displays information to be displayed in the first display unit while changing the information according to whether the orientation of the portable terminal apparatus determined by the orientation determination unit is a first orientation or a second orientation different from the first orientation.

8 Claims, 12 Drawing Sheets

(51) Int. Cl.
*H02J 7/00* (2006.01)
*B60K 35/00* (2006.01)

(52) U.S. Cl.
CPC .......... *H02J 7/0044* (2013.01); *H02J 7/0047* (2013.01); *H02J 50/10* (2016.02); *B60K 2370/152* (2019.05); *B60K 2370/164* (2019.05); *B60K 2370/166* (2019.05); *B60K 2370/47* (2019.05)

(58) Field of Classification Search
CPC .......... B60K 2370/166; B60K 2370/47; B60K 2370/52; B60K 2370/563; B60K 2370/573; H02J 7/00034; H02J 7/0047; H02J 50/10; H02J 7/0044
USPC ........................................................ 455/573
See application file for complete search history.

INFORMATION DISPLAY APPARATUS, INFORMATION DISPLAY SYSTEM, INFORMATION DISPLAY METHOD, AND PROGRAM

CROSS REFERENCE TO RELATED APPLICATION

This application is a Bypass Continuation of PCT/JP2019/016703 filed on Apr. 18, 2019, which is based upon and claims the benefit of priority from Japanese patent application No. 2018-146803, filed on Aug. 3, 2018, the disclosure of which is incorporated herein in its entirety by reference.

BACKGROUND

The present invention relates to an information display apparatus, an information display system, an information display method, and a program.

It has been common practice to dispose a car navigation system in an automobile so that its display unit is positioned near a dashboard of the automobile. For example, Patent Literature 1 (Japanese Unexamined Patent Application Publication No. 2009-274676) discloses a panel apparatus in which a movable panel including a display unit is moved in an opening/closing manner between an upright position and an upward-facing horizontal position by operating an actuator.

SUMMARY

It should be noted that, recently, a display apparatus has been made available in which a portable terminal apparatus such as a mobile phone (including a so called smartphone) is connected to a display apparatus installed in an automobile, so that functions of the portable terminal apparatus can be used through the display apparatus installed in the automobile. Even in such use, it is necessary to charge the portable terminal apparatus in the automobile.

However, when the portable terminal apparatus is charged in the automobile, it is necessary to insert a connection cable for the charging and charge the portable terminal apparatus through the connection cable. Note that when the panel apparatus disclosed in Patent Literature 1 is used as a part of the car navigation system, map information and the like can be displayed on the display unit of the panel apparatus. However, the panel apparatus operates independently of the charging of the portable terminal apparatus. Therefore, it is desired to develop a technique by which a portable terminal apparatus can be charged by a simpler method in an information display apparatus that displays information and the portable terminal apparatus can be effectively used even during its charging, and also develop a technique for easily selecting information to be displayed.

The present disclosure has been made in view of the above-described circumstances and it provides an information display apparatus, an information display system, an information display method, and a program, capable of easily charging a portable terminal apparatus while displaying information therein and capable of easily selecting information to be displayed therein.

An information display apparatus according to an embodiment includes: a first display unit configured to display information; a placement part configured so that a portable terminal apparatus is placed thereon, the placement part including a noncontact charging unit configured to charge the portable terminal apparatus placed on the placement part; an orientation determination unit configured to determine an orientation of the portable terminal apparatus placed on the placement part; a first display control unit configured to control display of information in the first display unit; and a charging control unit configured to control charging of the portable terminal apparatus by the noncontact charging unit, in which the charging control unit controls the noncontact charging unit so as to perform a process for charging the portable terminal apparatus when the portable terminal apparatus is placed on the placement part, and the first display control unit displays information to be displayed in the first display unit while changing the information according to whether the orientation of the portable terminal apparatus determined by the orientation determination unit is a first orientation or a second orientation different from the first orientation.

A method for displaying information according to an embodiment is a method for displaying information performed in an information display apparatus, the information display apparatus including: a first display unit configured to display information; and a placement part configured so that a portable terminal apparatus is placed thereon, the placement part including a noncontact charging unit configured to charge the portable terminal apparatus placed on the placement part, the method including: a step of controlling the noncontact charging unit so as to perform a process for charging the portable terminal apparatus when the portable terminal apparatus is placed on the placement part; a step of determining an orientation of the portable terminal apparatus placed on the placement part; and a step of displaying information to be displayed in the first display unit while changing the information according to whether the determined orientation of the portable terminal apparatus is a first orientation or a second orientation different from the first orientation.

A program according to an embodiment is a program for a computer configured to operate an information display apparatus the information display apparatus including: a first display unit configured to display information; and a placement part configured so that a portable terminal apparatus is placed thereon, the placement part including a noncontact charging unit configured to charge the portable terminal apparatus placed on the placement part, the program being configured to cause the computer to perform: a step of controlling the noncontact charging unit so as to perform a process for charging the portable terminal apparatus when the portable terminal apparatus is placed on the placement part; a step of determining an orientation of the portable terminal apparatus placed on the placement part; and a step of displaying information to be displayed in the first display unit while changing the information according to whether the determined orientation of the portable terminal apparatus is a first orientation or a second orientation different from the first orientation.

According to the present disclosure, it is possible to provide an information display apparatus, an information display system, an information display method, and a program, capable of easily charging a portable terminal apparatus while displaying information therein and capable of easily selecting information to be displayed therein.

DETAILED DESCRIPTION

First Embodiment

Figure 1:
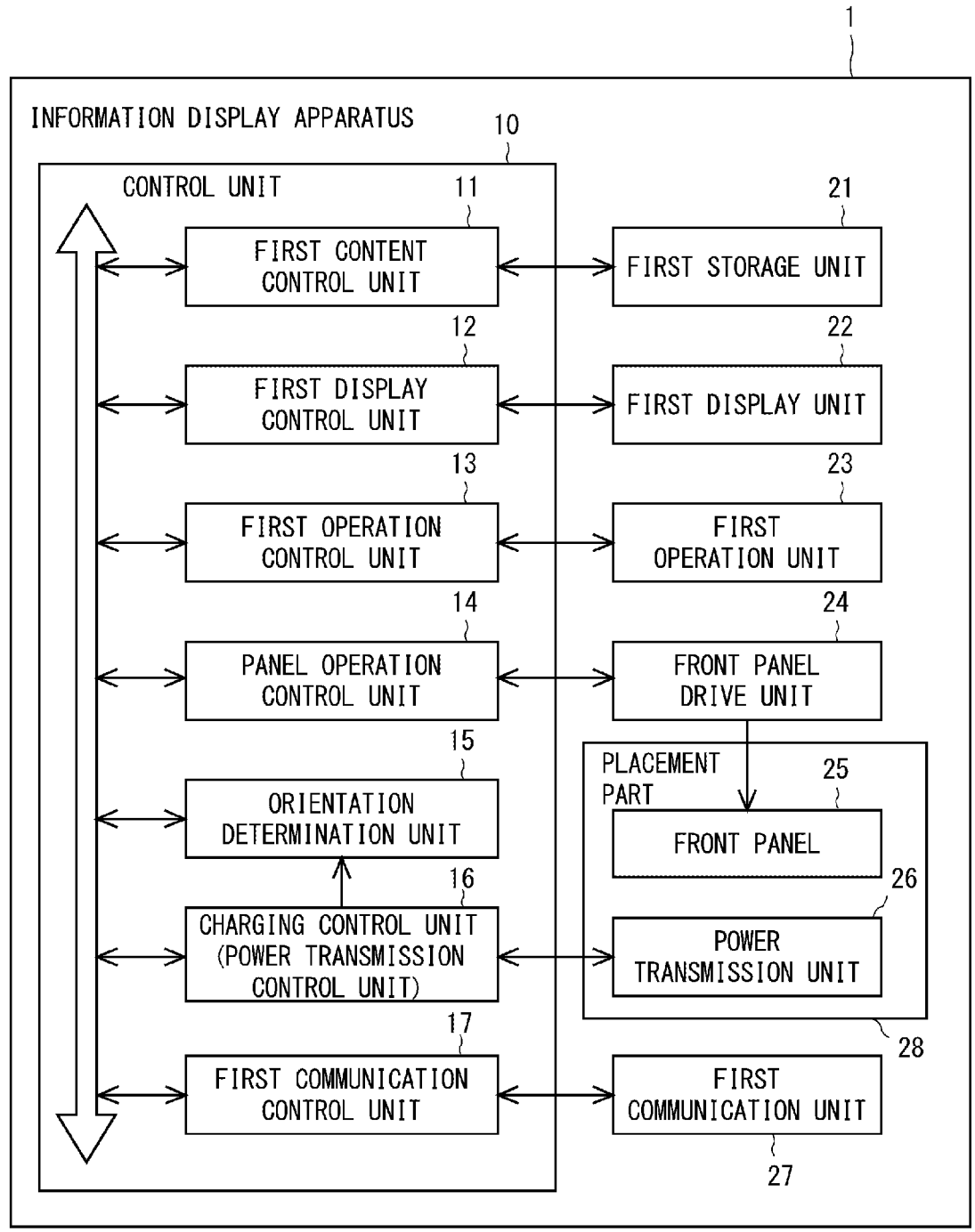
FIG. 1 is a block diagram showing an example of a configuration of an information display apparatus according to a first embodiment.
Figure 2:
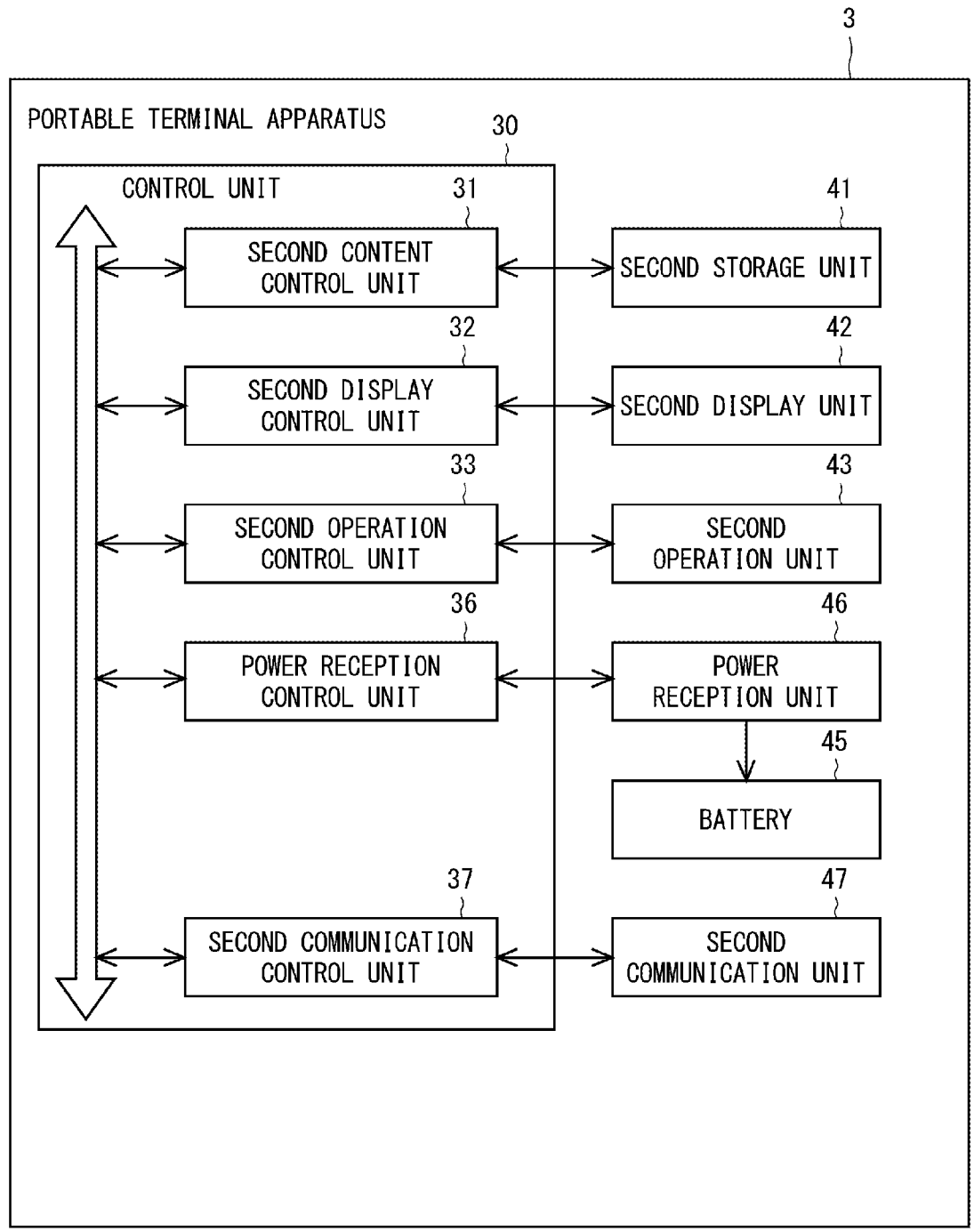
FIG. 2 is a block diagram showing an example of a configuration of a portable terminal apparatus which is charged by the information display apparatus shown in FIG. 1.

An information display apparatus according to this embodiment and an information display system including the information display apparatus and a portable terminal apparatus will be described with reference to FIGS. 1 to 11. FIG. 1 is a block diagram showing an example of a configuration of an information display apparatus according to this embodiment, and FIG. 2 is a block diagram showing an example of a configuration of a portable terminal apparatus that is charged by the information display apparatus.

As shown in FIG. 1, the information display apparatus 1 according to this embodiment includes a first display unit 22 that displays information, and a placement part 28 exemplified by a front panel 25 and a power transmission unit 26. Further, the information display apparatus 1 according to this embodiment may include a control unit 10 that controls the whole information display apparatus 1. Further, the information display apparatus 1 may include a first storage unit 21, a first operation unit 23, a front panel drive unit 24, and a first communication unit 27.

Note that the first display unit 22, the first storage unit 21, the first operation unit 23, the first communication unit 27, and some parts of the control unit 10 are prefixed with "first". Similarly, some parts of the portable terminal apparatus 3 are prefixed with "second". These prefixes are added to distinguish the components on the information display apparatus 1 side from those on the portable terminal apparatus 3 side for the sake of convenience.

The control unit 10 may include a first content control unit 11, a first display control unit 12, a first operation control unit 13, a panel operation control unit 14, an orientation determination unit 15, a power transmission control unit 16, and a first communication control unit 17.

The control unit 10 or a part thereof is implemented by, for example, a CPU (Central Processing Unit), a working memory, a nonvolatile storage device, and so on, or is implemented by an IC (Integrated Circuit). A control program to be executed by the CPU is stored in the storage device in advance. Then, the functions of the control unit 10 or a part thereof may be implemented as the CPU loads the program into the working memory and executes the loaded program. The first storage unit 21 may be a part of the storage device.

The first storage unit 21 may be implemented by a storage device such as a semiconductor memory or a hard disk drive, and can store contents and the like to be displayed in the first display unit 22 in the information display apparatus 1. The first content control unit 11 performs a process for reproducing a content stored in the first storage unit 21, and when the content is a video content, passes the content to the first display control unit 12 and an audio control unit (not shown), whereas when the content is an audio content, passes the content to the audio control unit. In this way, the video content is output from the first display unit 22 and the audio output unit such as a speaker(s) (not shown), whereas the audio content is output from the audio output unit. The first content control unit 11 may acquire a content or the like from other storage devices by using the first communication unit 27 or other communication means (which will be described later), and perform a process for reproducing the acquired content or the like.

The only requirement for the first display unit 22 is that it should be able to display information. Further, since the first display unit 22 generally displays information as an image, it may also be referred to as an image display unit. The first display unit 22 may be mainly formed by a display panel such as a liquid crystal panel or an organic EL (Electro-Luminescence) panel. The first display unit 22 displays an image of a content stored in the above-described first storage unit 21, another image generated in the information display apparatuses 1, an externally-received image, or the like. Note that the aforementioned image may include not only still images but also moving images (video images). The first display control unit 12 controls the first display unit 22 so as to display information. That is, the first display control unit 12 controls display of information in the first display unit 22.

The first operation unit 23 is an operation unit that receives a touch operation performed on a first display surface which is a display surface of the first display unit 22. The first operation unit 23 may include a touch sensor incorporated in or placed over the first display unit 22. A user can enter operation information by touching the first display surface of the first display unit 22. Note that the first operation unit 23 may include a hardware key(s). The first operation control unit 13 is a part that controls an operation for information displayed in the first display unit 22. The first operation control unit 13 may pass the operation information entered from the first operation unit 23 to a part related to its operation, and perform control so the operation information is reflected. Note that the functions of the first operation control unit 13 may be incorporated in the first operation unit 23.

The front panel drive unit 24 drives the front panel 25 so that it opens or closes. The front panel 25 may be a lid-like member that covers the first display unit 22 in a closed state. An example of the front panel 25 and an example of a method for opening/closing it will be described later with reference to FIG. 3 and the like. The panel operation control unit 14 controls driving by the front panel driving unit 24, i.e., controls the movement of the front panel 25. Needless to say, the front panel driving part 24 may not be provided and a mechanism for manually opening and closing the front panel 25 may instead be adopted. Note the information display apparatus 1 may include a sensor or the like that detects the opening and closing of the front panel 25 irrespective of whether or not the front panel drive unit 24 is provided.

The power transmission unit 26 is an example of a noncontact charging (wireless charging) unit, and supplies electric power (transmits electric power) to the closely-positioned portable terminal apparatus 3 shown in FIG. 2 in order to charge a battery 45 of the portable terminal apparatus 3 in a noncontact manner. The power transmission unit 26 can transmit electric power to the portable terminal apparatus 3 side by using, for example, electromagnetic induction, and the method for transmitting electric power is not limited to any particular methods. The power transmission control unit 16 is a part that controls the charging of the portable terminal apparatus 3 by the noncontact charging unit, i.e., a part that controls the power transmission by the power transmission unit 26. The power transmission control unit 16 is also referred to as a charging control unit 16 hereinafter. Note that although the orientation determination unit 15 itself will be described later, the charging control unit 16 may be configured so as to transmit information related to the charging to the orientation determination unit 15.

The first communication unit 27 is a part that communicates with the portable terminal apparatus 3 (communicates with the second communication unit 47 described later), and may include a communication interface. Each of the first and second communication units 27 and 47 may be a communication unit using a short-range wireless communication method such as Bluetooth (Registered Trademark). However, as long as they adopt the same communication method, information can be exchanged between the information display apparatus 1 and the portable terminal apparatus 3. The first communication control unit 17 controls communication performed by the first communication unit 27. Note that the information display apparatus 1 may include a separate communication unit that communicates with entities other than the portable terminal apparatus 3.

As shown in FIG. 2, the portable terminal apparatus 3, which is an entity that is charged by the information display apparatus 1 in a noncontact manner, includes a power reception unit 46 and an electricity storage unit exemplified by the battery 45. Further, the portable terminal apparatus 3 may also include a control unit 30 that controls the whole portable terminal apparatus 3, a second storage unit 41, a second display unit 42, a second operation unit 43, and a second communication unit 47. The portable terminal apparatus 3 may be a mobile phone (including a so called smartphone), a tablet terminal, or the like. Alternatively, it may be a portable PC (Personal Computer).

The control unit 30 may include a second content control unit 31, a second display control unit 32, a second operation control unit 33, a power reception control unit 36, and a second communication control unit 37.

The control unit 30 or a part thereof is implemented by, for example, a CPU, a working memory, a nonvolatile storage device, and son, or is implemented by an IC. A control program to be executed by the CPU is stored in the storage device in advance. Then, the functions of the control unit 30 or a part thereof may be implemented as the CPU load the program into the working memory and executes the loaded program. The second storage unit 41 may be a part of the storage device.

The second storage unit 41 may be implemented by a storage device such as a semiconductor memory or a hard disk drive, and can store contents and the like to be displayed in the second display unit 42 in the portable terminal apparatus 3. The second content control unit 31 performs a process for reproducing a content stored in the second storage unit 41, and when the content is a video content, passes the content to the second display control unit 32 and an audio control unit (not shown), whereas when the content is an audio content, passes the content to the audio control unit. In this way, the video content is output from the second display unit 42 and the audio output unit such as a speaker(s) (not shown), whereas the audio content is output from the audio output unit. The second content control unit 31 may acquire a content or the like from other storage devices by using the second communication unit 47 or other communication means (which will be described later), and perform a process for reproducing the acquired content or the like.

The only requirement for the second display unit 42 is that it should be able to display information. Further, since the second display unit 42 generally displays information as an image, it may also be referred to as an image display unit. The second display unit 42 may be mainly formed by a display panel such as a liquid crystal panel or an organic EL panel. The second display unit 42 displays an image of a content stored in the above-described second storage unit 41, another image generated in the portable terminal apparatus 3, an externally-received image, or the like. The second display control unit 32 controls the second display unit 42 so as to display information. That is, the second display control unit 32 controls display of information in the second display unit 42.

The second operation unit 43 is an operation unit (a terminal-side operation unit) that receives a touch operation performed on a second display surface which is a display surface of the second display unit 42. The second operation unit 43 may include a touch sensor incorporated in or placed over the second display unit 42. A user can enter operation information by touching the second display surface of the second display unit 42. Note that the second operation unit 43 may include a hardware key(s). The second operation control unit 33 is a part that controls operations for information displayed on the second display unit 42. The second operation control unit 33 may pass the operation information entered from the second operation unit 43 to a part related to its operation, and perform control so the operation information is reflected. Note that the functions of the second operation control unit 33 may be incorporated in the second operation unit 43.

The power reception unit 46 is a part that receives electric power transmitted from the closely-positioned power transmission unit 26. As described above for the power transmission unit 26, the charging method performed by the power transmission unit 26 and power reception unit 46 is not limited to any particular methods. The power reception control unit 36 is a part that controls power reception performed by the power reception unit 46, and may also be referred to as a charging control unit because it controls the charging. For example, when the battery 45 is fully charged, the power reception control unit 36 may perform control such as stopping the power reception by stopping the function of the power reception unit 46.

The second communication unit 47 is a part that communicates with the information display apparatus 1 (communicates with the first communication unit 27), and may include a communication interface. The second communication control unit 37 controls communication performed by the second communication unit 47. Note that the portable terminal apparatus 3 may include a separate communication unit that communicates with entities other than the information display apparatus 1.

Figure 3:
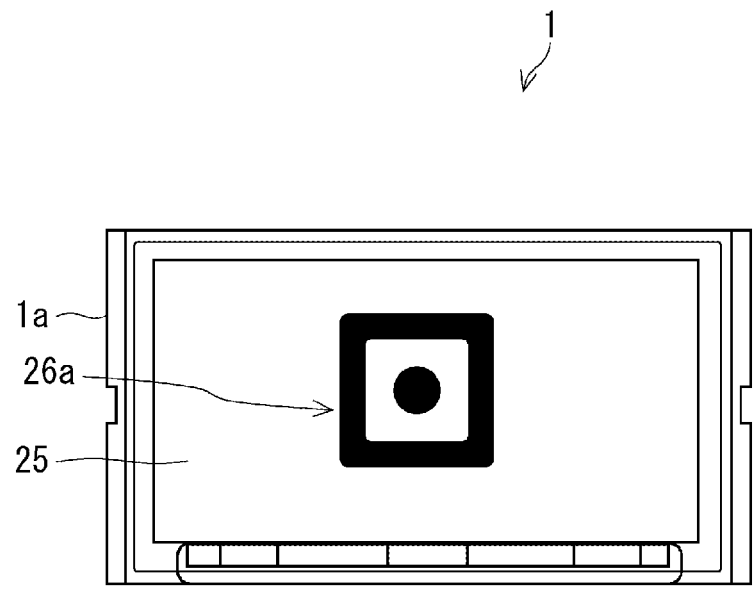
FIG. 3 is a front view showing an example of the information display apparatus shown in FIG. 1 in a first state.
Figure 4:
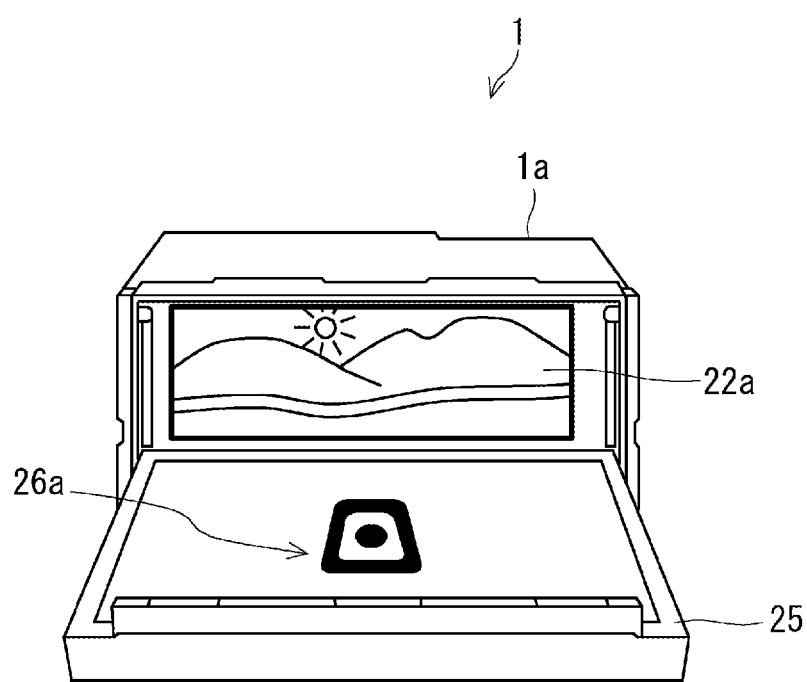
FIG. 4 is a perspective view showing an example of the information display apparatus shown in FIG. 1 in a second state.
Figure 5:
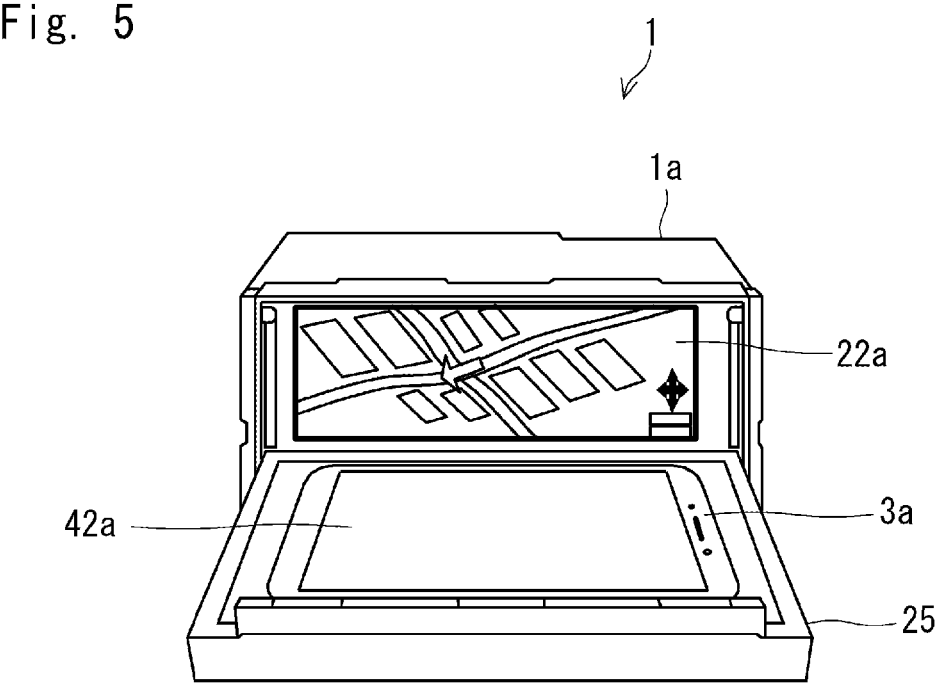
FIG. 5 is a perspective view showing an example of a state where a portable terminal apparatus is placed on the information display apparatus shown in FIG. 4.
Figure 6:
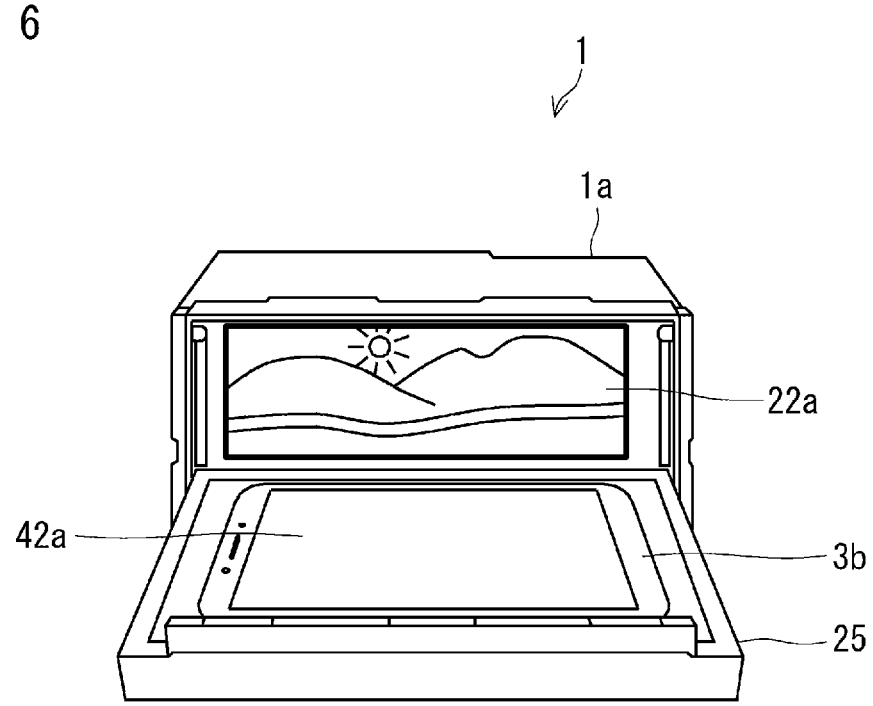
FIG. 6 is a perspective view showing an example of a state in which the portable terminal apparatus is placed in an orientation opposite to that in the example shown in FIG. 5 in the information display apparatus shown in FIG. 4.
Figure 7:
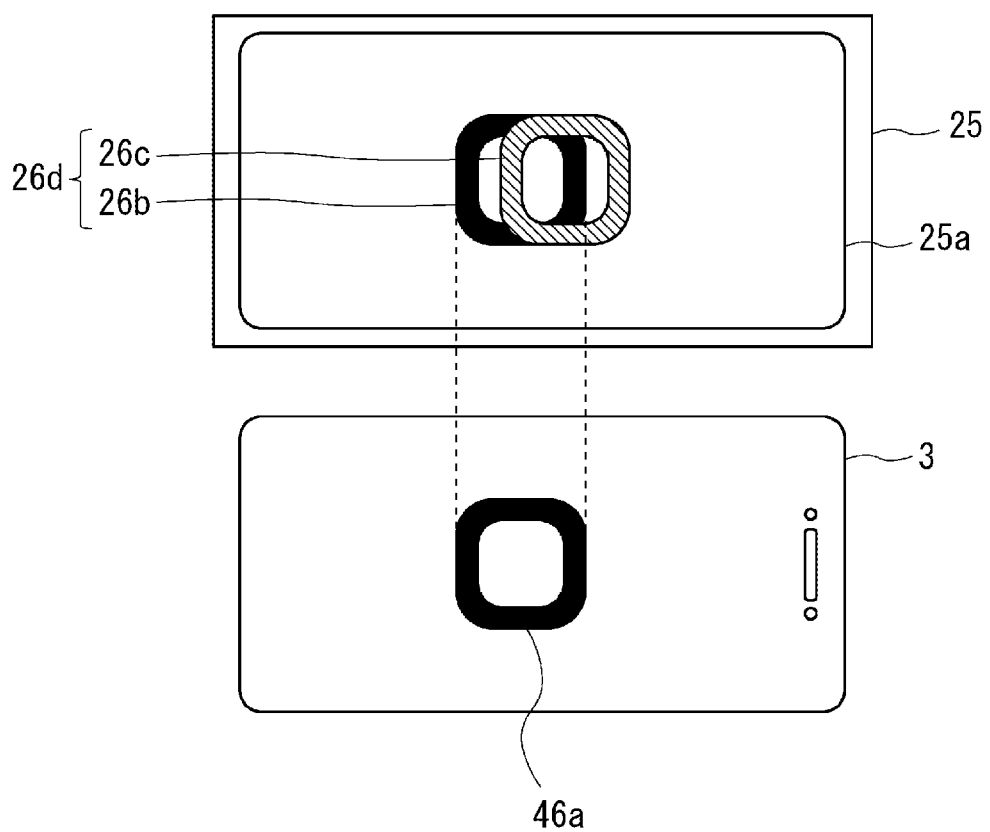
FIG. 7 is a diagram for explaining an example of a determination process performed by an orientation determination unit of the information display apparatus shown in FIG. 1.
Figure 8:
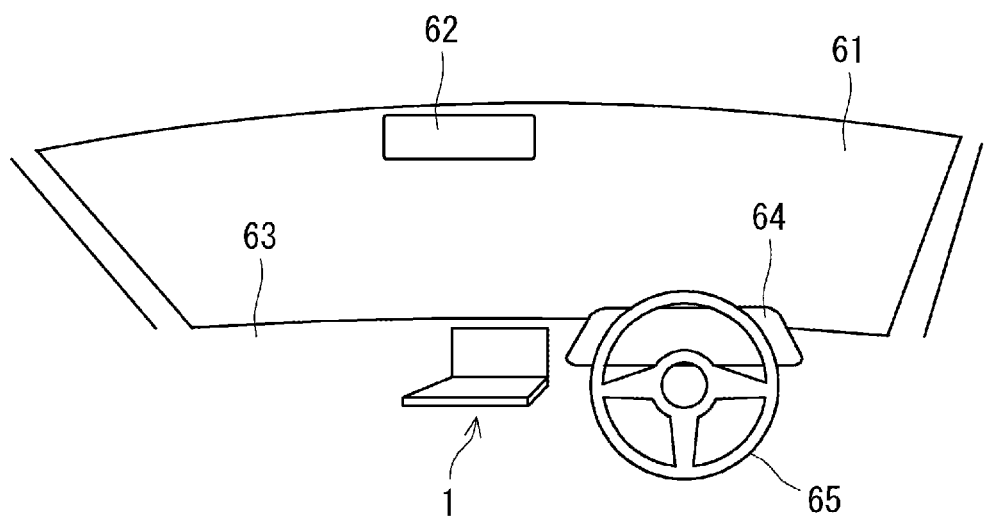
FIG. 8 is a schematic diagram showing an example of an installation place of the information display apparatus shown in FIG. 1 in an automobile.

Next, placement of the portable terminal apparatus 3 on the placement part 28 of the information display apparatus 1 according to this embodiment and display in the state in which the portable terminal apparatus 3 is placed on the placement part 28 will be described with reference to FIGS. 3 to 8 and the like. FIG. 3 is a front view showing an example of the information display apparatus 1 in a first state (which will be described later), and FIG. 4 is a front perspective view showing an example of the information display apparatus 1 in a second state (which will be described later). FIG. 5 is a front perspective view showing an example of a state in which the portable terminal apparatus 3 is placed in the information display apparatus 1 shown in FIG. 4, and FIG. 6 is a perspective view showing an example of a state in which the portable terminal apparatus 3 is placed in an orientation opposite to that in the example shown in FIG. 5. Further, FIG. 7 is a diagram for explaining an example of a determination process performed by the orientation determination unit 15. Further, FIG. 8 is a schematic diagram showing an example of an installation place of the information display apparatus 1 in an automobile.

The placement part 28 is a part on which the portable terminal apparatus 3 is placed, and includes a noncontact charging (wireless charging) unit that is exemplified by the power transmission part 26 and charges the portable terminal apparatus 3 in a state in which the portable terminal apparatus 3 is placed on the placement part. Further, the placement part 28 includes, for example, a flat plate-like member or the like exemplified by the front panel 25. Note that the placement part 28 may also be referred to as a lid part because it covers a first display surface 22*a* of the first display part 22. As shown in FIGS. 3 and 4, the front panel 25 is disposed in a housing 1*a* of the information display apparatus 1. Further, the power transmission unit 26 may be housed in, for example, a part indicated by a place 26*a*. Further, the power transmission control unit 16 may also be housed inside the above-described member. Both the first communication unit 27 and the first communication control unit 17, or only the first communication unit 27 may be housed inside the above-described member.

Further, the information display apparatus 1 may include a mechanism for changing the state of the above-described member exemplified by the front panel 25 between a first state in which the member covers the first display surface 22*a* of the first display unit 22 and a second state in which the first display surface 22*a* is exposed so that the portable terminal apparatus 3 can be placed thereon. This mechanism is referred to as an opening/closing mechanism hereinafter. An example of this opening/closing mechanism, i.e., a mechanism for automatically opening and closing the above-described member corresponds to the front panel drive unit 24. The panel operation control unit 14 controls the movement of the front panel 25 between the first and second states.

The first state may mean a closed state of the front panel 25 as shown in FIG. 3. The second state may mean an opened state of the front panel 25 as shown in FIG. 4. In the second state, the power transmission unit 26 can charge the portable terminal apparatus. That is, the first state may mean a state in which the front panel 25 is positioned so that a surface on the side thereof on which the portable terminal apparatus 3 is placed (i.e., a surface including a mark at the place 26*a*) faces in the same direction as the first display surface 22*a*. Further, the second state may mean a state in which the front panel 25 is disposed perpendicular to the first display surface 22*a*. Note that the first state and the second state may be referred to as a first mode and a second mode, respectively, and may also be referred to as a first form and a second form, respectively.

Generally speaking, the opening/closing method in the opening/closing mechanism is not limited to any particular methods. For example, in the case of performing the change shown in FIGS. 3 and 4, the opening/closing mechanism may be the following mechanism. That is, in this case, the opening/closing mechanism is a mechanism for sliding the lower side of the front panel 25 forward while moving the upper side thereof downward when the front panel 25 is opened (i.e., when its state is changed from the first state to the second state). Further, in this case, the opening/closing mechanism is a mechanism for causing the front panel 25 to perform the reverse of the above-described movement when it is closed (i.e., when its state is changed the second state to the first state).

The first and second states are not limited to above-described states. However, in consideration of the installation of the information display apparatus 1 and the placement of the portable terminal apparatus 3, it is desirable that the front panel 25 be disposed so as to face the first display surface 22*a* of the first display part 22 in the first state, and the front panel 25 be disposed perpendicular to the first display surface 22*a* of the first display part 22 in the second state. As another example similar to the above-described example, the first state may mean a state in which the front panel 25 is positioned so that the surface on the side thereof on which the portable terminal apparatus 3 is placed faces the first display surface 22*a*, and the second state may mean a state in which the front panel 25 is disposed perpendicular to the first display surface 22*a*. In this example, it is possible to adopt, as the opening/closing mechanism, a mechanism by which the upper side of the front panel 25 is tilted forward when it is opened and the reverse of this movement is performed when it is closed. Note that the aforementioned perpendicular is not strictly limited to 90 degrees and includes a range of angles having some width around the angle of 90 degrees.

The first display unit 22 in the second state may be in the following display state.

As exemplified by the first display surface 22a shown in FIG. 4, the first display control unit 12 can perform control so as to display information in the first display unit 22 when the front panel 25 is in the second state. Whether the front panel 25 is in the second state or in the first state may be determined based on the control contents of the panel operation control unit 14, or may be determined based on a detection result in the case where the above-described sensor is provided. Note that the first display control unit 12 may perform control so as to display no information when the portable terminal apparatus 3 is not placed on the front panel 25 even though the front panel 25 is in the second state.

In this embodiment, it is possible to change information to be displayed in the first display unit 22 according to the orientation in which the portable terminal apparatus 3 is placed on the front panel when it is charged. As described above, in the second state, the portable terminal apparatus 3 is charged in the state in which the portable terminal apparatus 3 is placed on the placement part 28 (i.e., on the front panel 25).

When the portable terminal apparatus 3 is placed on the placement part 28, the charging control unit 16 controls the power transmission unit 26 so as to charge the portable terminal apparatus 3. That is, when the front panel 25 is in the second state and the portable terminal apparatus 3 is placed on the front panel 25, the charging control unit 16 controls the power transmission unit 26 so as to charge the placed portable terminal apparatus 3 (i.e., so as to start to supply electric power). Note that in this case, it may be determined whether the front panel 25 is in the second state or in the first state. However, this determination process may be omitted as long as it can be determined whether the portable terminal apparatus 3 is placed on the front panel. This is because the portable terminal apparatus 3 cannot be placed unless the front panel 25 is in the second state.

Then, the first display control unit 12 displays information to be displayed on the first display unit 22 while changing the information according to whether the orientation of the portable terminal apparatus 3 determined by the orientation determination unit 15 is a first orientation or a second orientation different from the first orientation. That is, the first display control unit 12 performs control so as to change the information to be displayed in the first display unit 22 according to the determined orientation. This control for changing the information may be, for example, control for switching a source of the information to be displayed as described hereinafter. That is, when the orientation determined by the orientation determination unit 15 is the first orientation, the first display control unit 12 makes the first display unit 22 display information received from the portable terminal apparatus 3. Hereinafter, the information received from the portable terminal apparatus 3 is also expressed as information based on the portable terminal apparatus 3. On the other hand, when the orientation determined by the orientation determination unit 15 is the second orientation different from the first orientation, the first display control unit 12 makes the first display unit 22 display information other than the information based on the portable terminal apparatus 3. Hereinafter, the information other than the information based on the portable terminal apparatus 3 is also expressed as information based on the information display apparatus 1.

FIG. 5 shows an example of a state in which the portable terminal apparatus 3 is placed in the first orientation on the front panel 25. For the sake of convenience, the portable terminal apparatus 3 placed in the first orientation is referred to as a portable terminal apparatus 3a in the following description. Further, FIG. 6 shows an example of a state in which the portable terminal apparatus 3 is placed in the second orientation on the front panel 25. For the sake of convenience, the portable terminal apparatus 3 placed in the second orientation is referred to as a portable terminal apparatus 3b in the following description. In the example shown in FIG. 5, a navigation image (a map image including information related to a route guide) received from the portable terminal apparatus 3a is displayed on the first display surface 22a. Meanwhile, in the example shown in FIG. 6, an image of a content stored inside the information display apparatus 1 (e.g., in the first storage unit 21) is displayed on the first display surface 22a. As described above, in FIGS. 5 and 6, in these two situations, different images obtained from sources different from each other are displayed on the respective first display surfaces 22a. However, there are cases in which even though the sources of information to be displayed on the first display surfaces 22a are different from each other in these two situations, images that are eventually displayed thereon are the same as each other.

The aforementioned orientation determination unit 15 will be described. The orientation determination unit 15 determines the orientation (i.e., the direction of the placement) of the portable terminal apparatus 3 placed on the placement part 28. The power transmission unit 26 has a function of charging the placed portable terminal apparatus 3 in a noncontact manner as described above, and the orientation determination unit 15 preferably determines the orientation of the portable terminal apparatus 3 by using this function. In this case, the charging control unit 16 may be configured so as to transmit information related to the charging to the orientation determination unit 15.

As shown in FIG. 7, the power transmission unit 26 may be embedded at or near the center of a placement area 25a provided on the front panel 25 and may include a coil array 26d composed of coils 26b and 26c that are arranged so to be shifted from each other. Note that the placement area 25a may be formed on the front panel 25 as, for example, a recessed part that conforms to the size of an ordinary portable terminal apparatus 3. Meanwhile, as shown in FIG. 7, a coil 46a constituting the power reception unit 46 provided in the portable terminal apparatus 3 may be disposed at a place that is displaced from the center of the portable terminal apparatus 3 in the vertical direction.

By the above-described configuration, the charging control unit 16 can determine which of the coils 26b and 26c the portable terminal apparatus 3 can be charged by. As the charging control unit 16 transmits a result of the determination to the orientation determination unit 15, the orientation determination unit 15 can determine the orientation of the portable terminal apparatus 3, i.e., can determine which of the states represented by the portable terminal apparatuses 3a and 3b the actual portable terminal apparatus 3 is in.

Note that the orientation determination unit 15 is not limited to this example. That is, the orientation determination unit 15 may be configured to make a determination by using the noncontact charging function or may be configured to make a determination without using the noncontact charging function. For example, the orientation determination unit 15 may be configured so as to determine the orientation of the portable terminal apparatus 3 by visually recognizing it by using a separately-provided camera without using the noncontact charging function.

Further, as shown as the portable terminal apparatuses 3a and 3b, the portable terminal apparatus 3 may adopt such a structure that the portable terminal apparatus 3 can be charged by placing it on the front panel 25 so that a second display surface 42a of the second display unit 42 faces upward. Therefore, the power reception unit 46 of the portable terminal apparatus 3 may be disposed near the surface of the portable terminal apparatus 3 opposite to the second display surface 42a.

The portable terminal apparatus 3b is vertically turned (i.e., turned in the left/right direction) from the portable terminal apparatus 3a. As in the case of the above-described example, it is preferable to define the first and second orientations so that they are opposite to each other, because, by doing so, the orientation determination unit 15 can easily determine the orientation of the portable terminal apparatus 3. Note that the opposite orientations do not necessary have to be orientations different by exactly 180 degrees. That is, the opposite orientations may be orientations substantially opposite to each other.

Further, as shown in FIG. 8, the information display apparatus 1 can be installed in, for example, a dashboard 63 in an automobile. Note that in FIG. 8, a reference numeral 61 indicates a windshield; a numeral 62 indicates a rear view mirror; a numeral 64 indicates an instrument panel; and a numeral 65 indicates a steering wheel.

Figure 9:
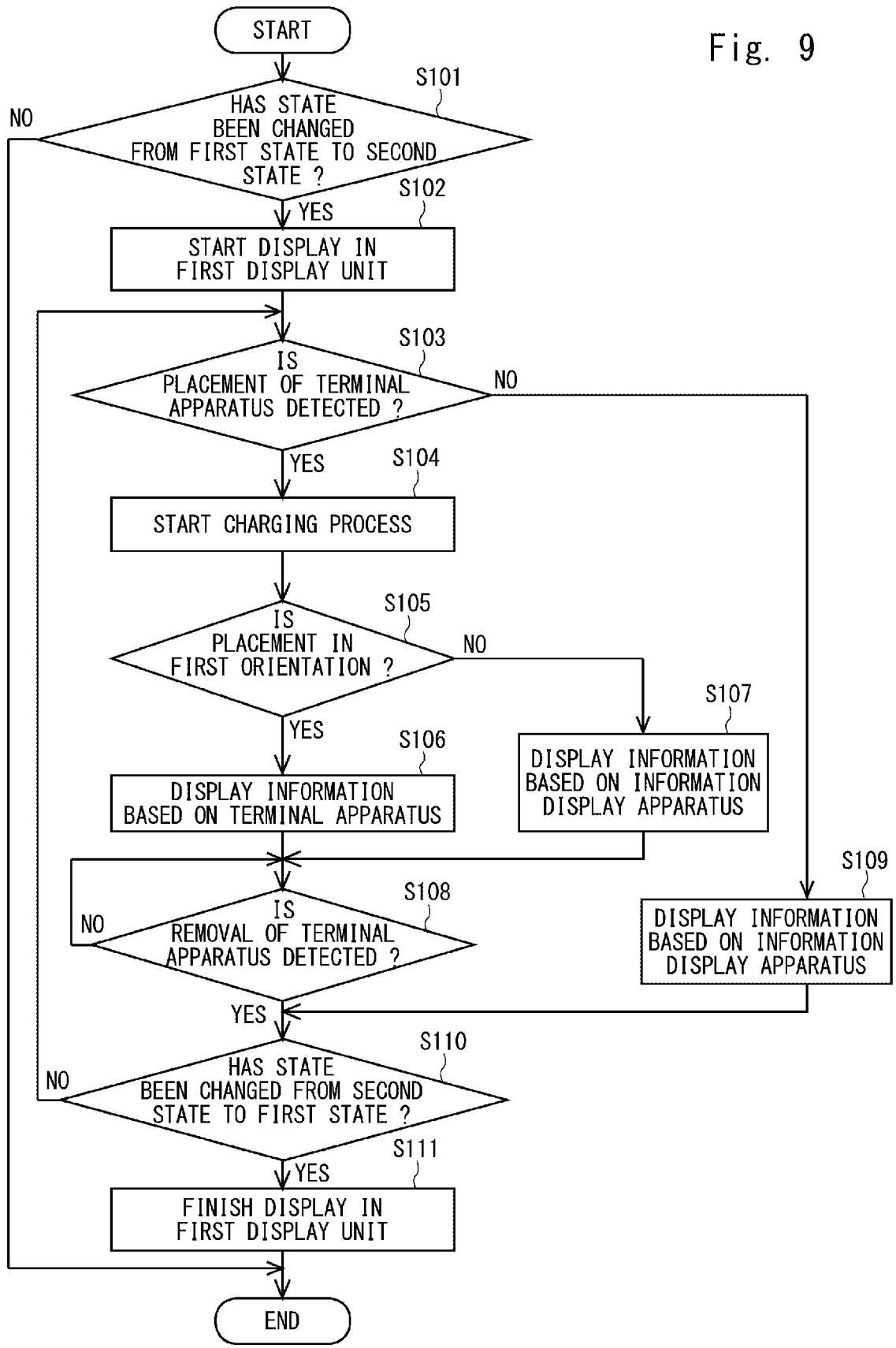
FIG. 9 is a flowchart showing an example of processed performed by the information display apparatus shown in FIG. 1.

Next, an example of processes performed by the information display apparatus 1 will be described with reference to FIG. 9 and the like. FIG. 9 is a flowchart for explaining an example of processes performed by the information display apparatus 1. Note that the following description is given on the assumption that when the information display apparatus 1 starts to be used, it is in the first state. However, the present invention is not limited to such examples. The start of the use of the information display apparatus 1 may be, for example, when it is powered on.

Firstly, the panel operation control unit 14 (or the control unit 10) determines whether or not the state of the information display apparatus 1 has changed from the first state to the second state (step S101). It is possible to configure the information display apparatus 1 so that its state automatically changes from the first state to the second state when, for example, the information display apparatus 1 is started up. Alternatively, the first state may be maintained until an operation for changing the state from the first state to the second state is entered by a user. Then, when a user operation is received, the state may be changed to the second state. Examples of such user operations include an action in which a user presses an electrical switch and a state in which a press on the front panel by a user is detected.

In the case of Yes at the step S101, the first display control unit 12 controls the first display unit 22 to display information and hence the display of the information is started (step S102). Note that the information displayed at this point can be arbitrarily determined. For example, it is possible to display an image of a menu in the information display apparatus 1, an image of playing back an audio content stored in the information display apparatus 1, a navigation image stored in the information display apparatus 1, or the like in the first display unit 22. Alternatively, it is possible to display, through communication with the portable terminal apparatus 3, an image of playing back an audio content functioning in the portable terminal apparatus 3, an image of navigation functioning in the portable terminal apparatus 3, or the like in the first display unit 22. Note that in the case of No at the step S101, the process is finished.

Subsequent to the step S102, the charging control unit 16 determines whether or not placement of the portable terminal apparatus (also referred to simply as a terminal apparatus) 3 is detected (step S103). The charging control unit 16 can detect that the portable terminal apparatus 3 is placed on the placement part by, for example, detecting a signal that the power reception unit 46 transmits in response to intermittent power transmission from the power transmission unit 26.

In the case of Yes at the step S103, the charging control unit 16 starts a charging process (step S104). Note that the charging process may include processes for detecting the remaining power of the portable terminal apparatus, charging the portable terminal apparatus when it is not fully charged, and stopping the charging when it is fully charged. The charging process may also include a process for stopping the charging when the temperature is abnormal, in addition to stopping the charging when the portable terminal apparatus is fully charged.

After the portable terminal apparatus 3 is placed and the charging process is started in the step S104, the orientation determination unit 15 determines whether the placed portable terminal apparatus 3 is placed in the first orientation or not (i.e., or is placed in the second orientation) (step S105).

In the case of Yes at the step S105 (in the case of the first orientation), the first display control unit 12 performs control so as to make the first display unit 22 display information based on the portable terminal apparatus 3 (step S106). In this control, for example, the control unit 10 instructs the first communication control unit 17 to receive the aforementioned information from the portable terminal apparatus 3 through the first communication unit 27.

The information based on the portable terminal apparatus 3 displayed in the step S106 may be, for example, a navigation image by a navigation function of the portable terminal apparatus 3 as shown in FIG. 5. The navigation function of the portable terminal apparatus 3 may be implanted by, for example, installing an application such as Apple CarPlay (Registered Trademark) or Android Auto (Registered Trademark) in the portable terminal apparatus 3.

It is particularly useful when the information display apparatus 1 does not have a navigation function, or when a user wants to use a navigation function of the portable terminal apparatus 3 even though the information display apparatus 1 has a navigation function. It is possible to display a navigation image by the navigation function of the portable terminal apparatus 3 in the first display unit 22 and receive an operation for the displayed image through the first operation unit 23 of the information display apparatus 1. The above-described process can be implemented by transmitting information about an operation received in the first operation unit 23 to the portable terminal apparatus 3 through the first communication unit 27 and receiving its response.

Further, as another example, the information based on the portable terminal apparatus 3 displayed in the step S106 may be, for example, an image of a content reproduced by the portable terminal apparatus 3. It is useful when a user wants to reproduce and display a content of the portable terminal apparatus 3, instead of reproducing and displaying a content of the information display apparatus 1.

When the information based on the portable terminal apparatus 3 has already been displayed, such as during the step S102, all that has to be done in the step S106 is to continue this displaying process. However, in the step S106, it is also possible to display an image obtained by a predetermined function. That is, the information display apparatus 1 may be configured so as to be able to make a setting so that when the information display apparatus 1 displays the information based on the portable terminal apparatus 3 in the step S106, it displays predetermined information (e.g., a navigation image, a content image, etc.). By requesting information from the portable terminal apparatus 3 according to the setting, it is possible to display set information in the first display unit 22. Needless to say, the information display apparatus 1 may also be configured so as to be able to make a setting so that even when the information display apparatus 1 displays the information based on the portable terminal apparatus 3 in the step S102, it displays predetermined information in a similar manner.

On the other hand, in the case of No at the step S105 (in the case of the second orientation), the first display control unit 12 performs control so as to make the first display unit 22 display information based on the information display apparatus 1 (step S107). In this way, it is possible to display, for example, a content image stored in the first storage unit 21 as shown in FIG. 6 or a navigation image by the navigation function of the information display apparatus 1 in the first display unit 22. When the information based on the information display apparatus 1 has already been displayed, such as during the step S102, all that has to be done in the step S107 is to continue this displaying process. However, based on the same concept as that in the step S106, it is also possible to display an image obtained by a predetermined function in the step S107.

After the process in the step S106 or the process in the step S107, the charging control unit 16 determines whether or not removal of the portable terminal apparatus 3 is detected (sensed) (step S108). In the step S108, when the signal that the power reception unit 46 transmits in response to the intermittent power transmission from the power transmission unit 26 is not detected, the power transmission control unit 16 can determine that the portable terminal apparatus 3 is no longer placed on the placement part (has been removed).

On the other hand, in the case of No at the step S103, i.e., when the portable terminal apparatus 3 is not placed on the placement part, the first display control unit 12 performs control so as to make the first display unit 22 display the information based on the information display apparatus 1 as in the case of the step S107 (step S109).

After the process in the step S109 or when the determination result is Yes in the step S108, the panel operation control unit 14 (or the control unit 10) determines whether or not the state has changed from the second state to the first state (step S110). The determination method in this process may be the same as that in the step S101. In the case of Yes at the step S110, the first display control unit 12 finishes the display in the first display unit 22 (step S111) and finishes the process. On the other hand, in the case of No at the step S110, the process returns to the step S103 and similar processes are performed therefrom.

Figure 10:
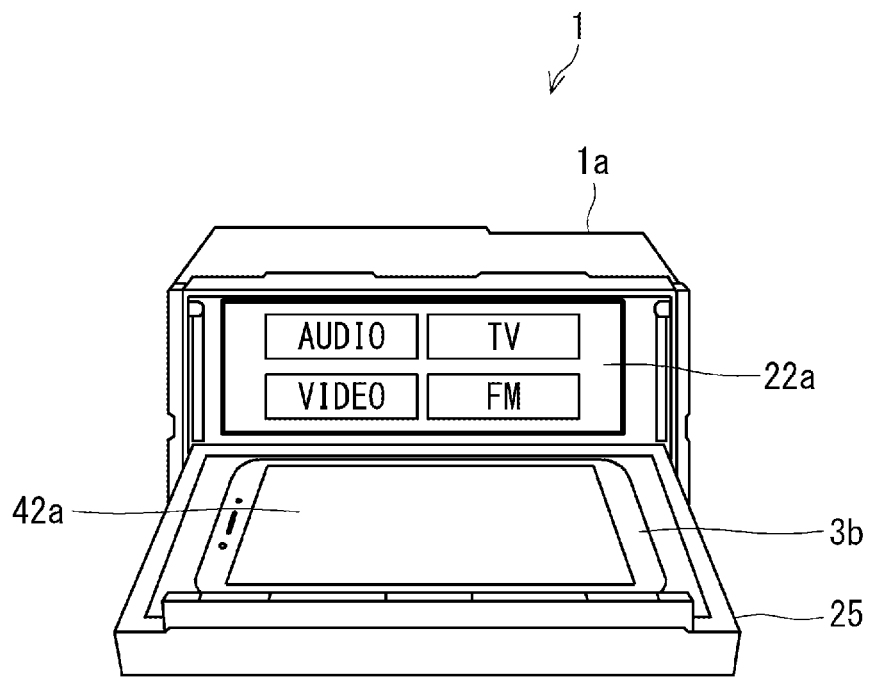
FIG. 10 is a front perspective view showing another example of a state in which a portable terminal apparatus is placed on the information display apparatus shown in FIG. 4.
Figure 11:
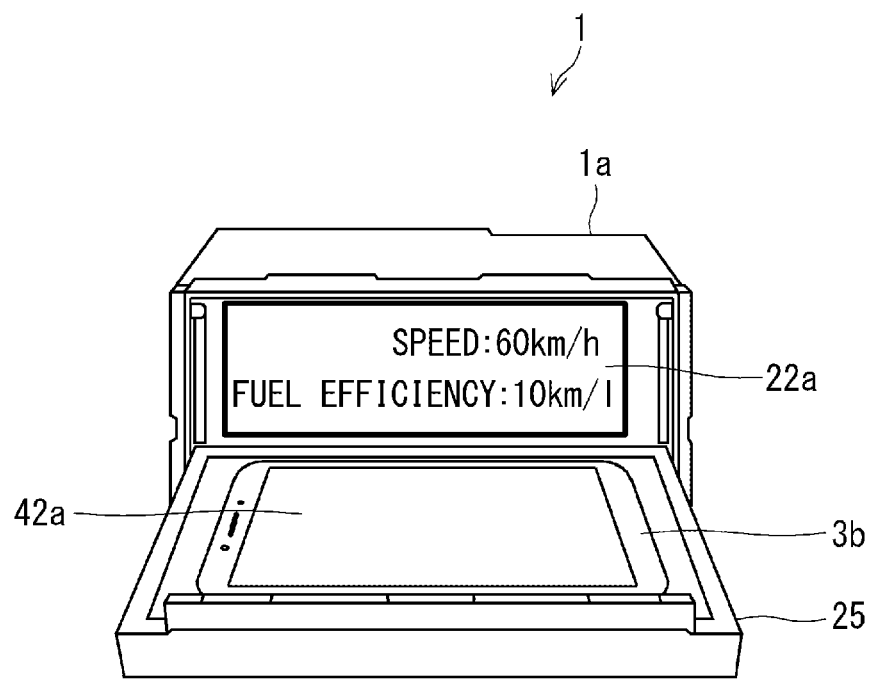
FIG. 11 is a front perspective view showing another example of a state in which a portable terminal apparatus is placed on the information display apparatus shown in FIG. 4.

Next, other examples of the display in the information display apparatus 1 will be described with reference to FIGS. 10 and 11 and the like. Each of FIGS. 10 and 11 is a front perspective view showing another example of a state in which the portable terminal apparatus 3b is placed in the information display apparatus 1. It is assumed that the information display apparatus 1 in each of the two examples described hereinafter with reference to FIGS. 10 and 11 displays information related to, for example, a route guide received from the portable terminal apparatus 3a as shown in FIG. 5 in a state in which the portable terminal apparatus 3 placed on the front panel 25 in the first orientation. However, the displayed information is not limited to the information related to the route guide. That is, the present invention may be applied in a similar manner even when other types of information received from the portable terminal apparatus 3a are displayed.

In the information display apparatus 1 shown in FIG. 10, the first display control unit 12 makes the first display unit 22 display an image for operating a content stored in the information display apparatus 1 when the orientation determined by the orientation determination unit 15 is the second orientation. That is, the information display apparatus 1 displays the image for operating the content stored in the information display apparatus 1 on the first display surface 22a in a state in which the portable terminal apparatus 3 is placed on the front panel 25 in the second orientation, for example, as shown in FIG. 10. This image may be a GUI (Graphical User Interface) image.

FIG. 10 shows an example in which various contents including AUDIO (audio contents), VIDEO (video contents), TV (television broadcast contents), and FM (FM (Frequency Modulation) broadcast contents) are displayed in a selectable state. However, the image for operating contents is not limited to such examples. Note that among the above-shown contents, the audio contents and the video contents may be stored in, for example, the first storage unit 21. When one of the various types of contents is selected by a user in FIG. 10, the information display apparatus 1 may display a list of the selected type of contents (not shown) and may reproduce a content selected from the list.

In this way, it is possible to switch the display between the route guide received from the portable terminal apparatus 3 and the image for operating contents (the content operation screen) in the information display apparatus 1 just by changing the orientation in which the portable terminal apparatus 3 is placed.

The information display apparatus 1 shown in FIG. 11 may be an apparatus used in a vehicle such as an automobile and may include a vehicle information acquisition unit (not shown). The vehicle information acquisition unit is a part that acquires information related to the vehicle (vehicle information) from the main-body side of the vehicle, and may be disposed in, for example, the control unit 10. The vehicle information acquisition unit can be connected to the main-body side of the vehicle through, for example, a CAN (Controller Area Network). Examples of the vehicle information include various types of information such as a traveling speed of the vehicle, average fuel efficiency over a certain period, a total traveling distance, and a traveling distance from a designated time point. For example, the vehicle may include a camera for photographing the surroundings of the vehicle such as a rear view of the vehicle, and a video image (or a still image) taken by the camera may be used as the vehicle information.

Then, in the information display apparatus 1, when the orientation determined by the orientation determination unit 15 is the second orientation, the first display control unit 12 makes the first display unit 22 display information related to the vehicle acquired by the vehicle information acquisition unit. That is, in a state where the portable terminal apparatus 3 is placed on the front panel 25 in the second orientation, the information display apparatus 1 makes the first display surface 22a display vehicle information such as a speed (a traveling speed) and fuel efficiency (average fuel efficiency), for example, as shown in FIG. 11.

In this way, it is possible to switch the display between the route guide received from the portable terminal apparatus 3 and the vehicle information of the vehicle in which the information display apparatus 1 is installed just by changing the orientation in which the portable terminal apparatus 3 is placed.

As described above, according to the information display apparatus 1 in accordance with this embodiment, it is possible to easily charge the portable terminal apparatus 3 while displaying information therein and to easily select information to be displayed therein. That is, in the information display apparatus 1, it is possible to charge the portable terminal apparatus 3 in a noncontact manner, display information therein during the charging, and enable a user to easily select the information to be displayed. It should be noted that making the first display unit 22 display information is considered to be equivalent to using its function. Therefore, the fact that information to be displayed can be easily selected means that a desired function (including a desired function of the portable terminal apparatus 3) can be easily selected.

Second Embodiment

Figure 12:
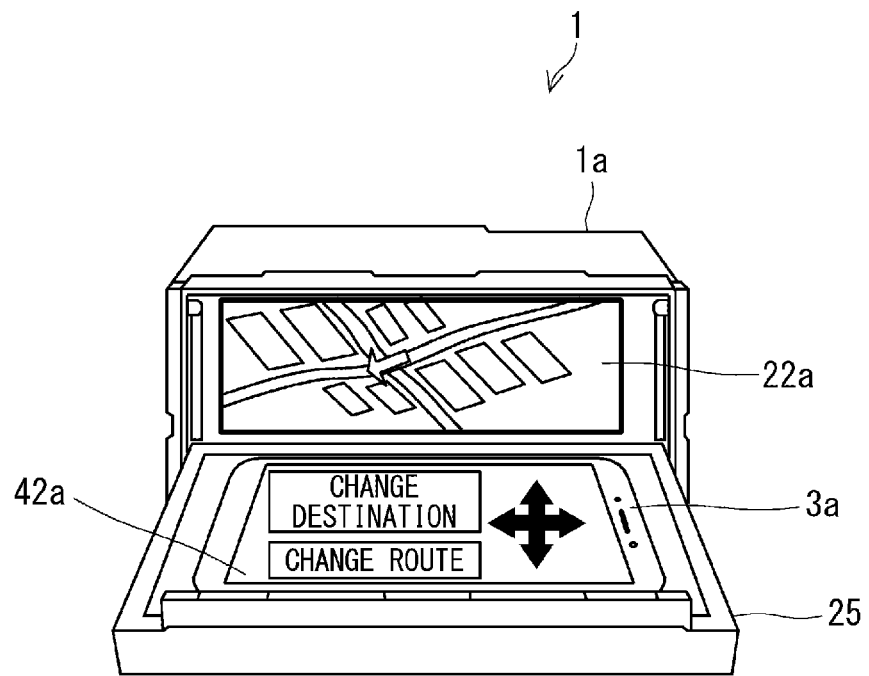
FIG. 12 is a front perspective view showing an example of a state in which a portable terminal apparatus is placed on the information display apparatus according to a second embodiment.
Figure 13:
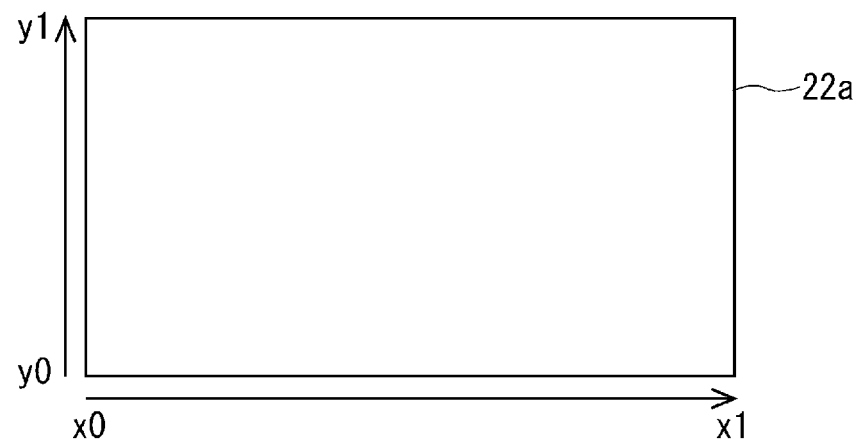
FIG. 13 is a diagram for explaining an example of a setting for a touch operation in the information display apparatus according to the second embodiment.
Figure 14:
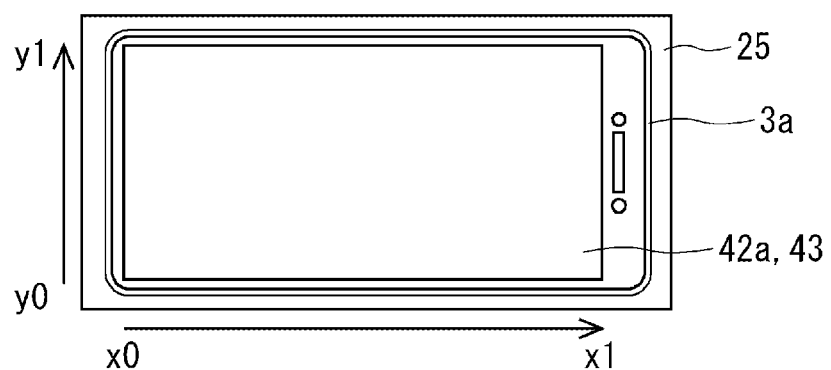
FIG. 14 is a diagram for explaining an example of a setting for a touch operation in the information display apparatus according to the second embodiment.
Figure 15:
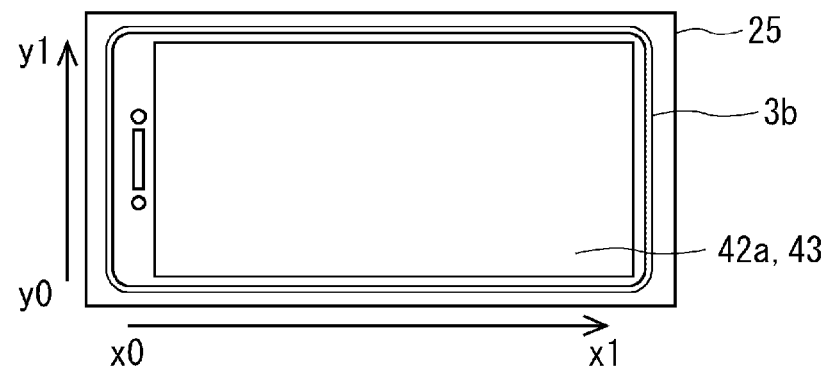
FIG. 15 is a diagram for explaining an example of a setting for a touch operation in the information display apparatus according to the second embodiment.
Figure 16:
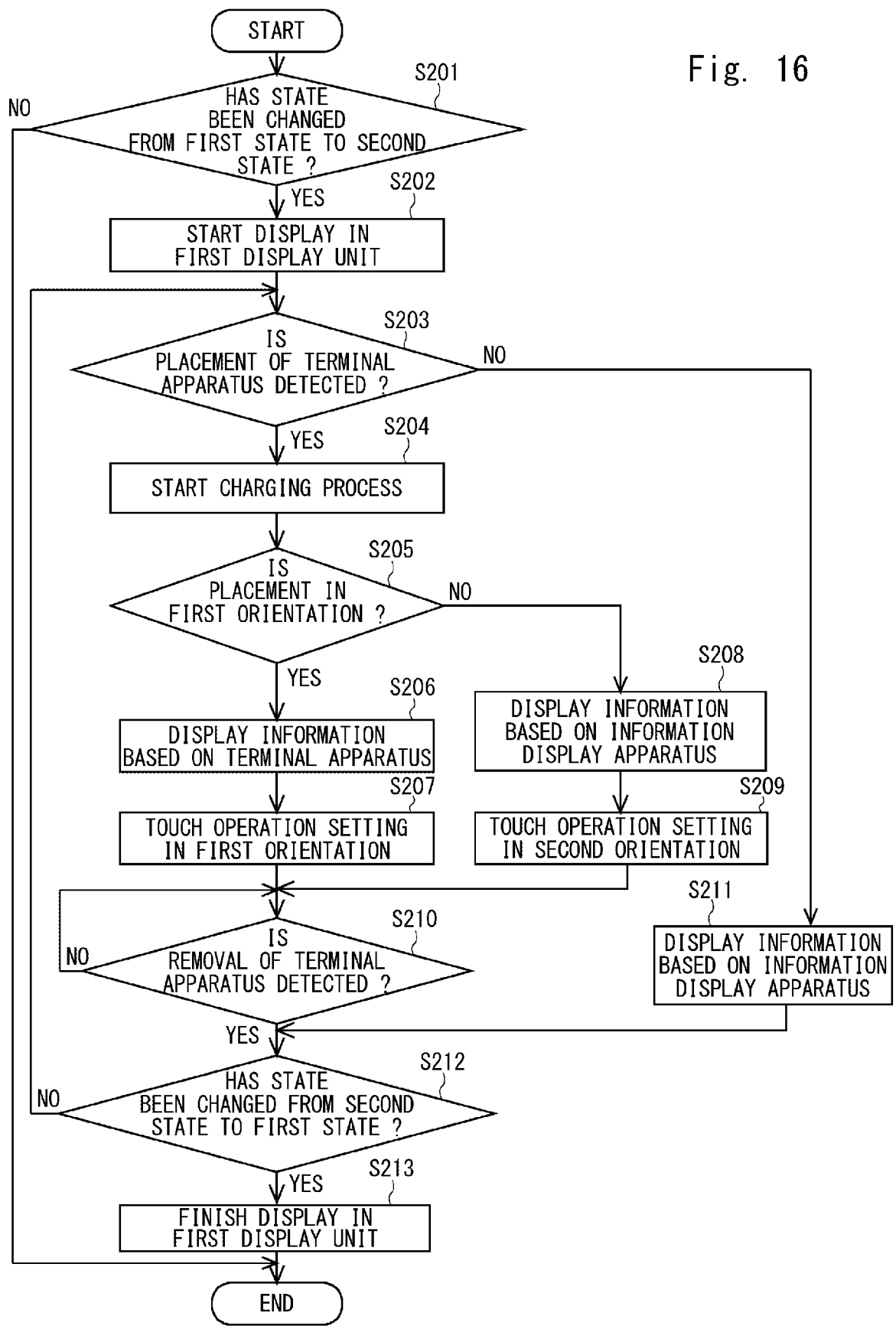
FIG. 16 is a flowchart for explaining an example of processes performed by the information display apparatus according to the second embodiment.

An information display apparatus and an information display system according to a second embodiment will be described with reference to FIGS. 12 to 16 and the like. FIG. 12 is a front perspective view showing an example of a state in which a portable terminal apparatus is placed in an information display apparatus according to this embodiment. FIGS. 13 to 15 are diagrams for explaining an example of a setting for a touch operation in the information display apparatus according to this embodiment, and FIG. 16 is a flowchart for explaining an example of processes performed by the information display apparatus according to this embodiment. The information display apparatus and the portable terminal apparatus according to this embodiment may have basically the same configurations as those described above with reference to FIGS. 1 and 2. Therefore, this embodiment will be described based on the configurations of the information display apparatus 1 and the portable terminal apparatus 3. In this embodiment, generally speaking, various examples described in the first embodiment can also be applied.

As described in the first embodiment, in this embodiment, the first display control unit 12 also makes the first display unit 22 display information received from the portable terminal apparatus 3 when the orientation determined by the orientation determination unit 15 is the first orientation. For example, as shown in FIG. 12, the first display control unit 12 may make the first display surface 22a display a navigation image (a map image including information indicating a route guide) received from the portable terminal apparatus 3a.

However, in this embodiment, when the orientation determined by the orientation determination unit 15 is the first orientation, the following control is performed in addition to the above-described control. That is, when the orientation determined by the orientation determination unit 15 is the first orientation, the second display control unit 32 makes the second display unit 42 display an operation image through which a user operates information to be displayed in the first display unit 22 (e.g., the information indicating the route guide in the example shown in FIG. 12). FIG. 12 shows an example in which a cross icon for receiving an operation for moving a display range, a destination change icon for receiving an operation for changing a destination, and a route change icon for receiving an operation for changing a route (a path) are displayed as the above-described operation image on the second display surface 42a in an operable state.

In particular, as shown in FIG. 12, the second display control unit 32 makes the second display unit 42 display the above-described operation image in an orientation conforming to the orientation of the display in the first display unit 22.

Note that for the above-described display control, the second display control unit 32 needs to recognize that it has been determined that the portable terminal apparatus 3 is placed in the first orientation by the orientation determination unit 15.

Therefore, the portable terminal apparatus 3 can receive the result of the determination made by the orientation determination unit 15 from the information display apparatus 1 through, for example, communication between the second communication unit 47 and the first communication unit 27. For example, when the control unit 10 of the information display apparatus 1 performs control so as to display information received from the portable terminal apparatus 3, it instructs the first communication control unit 17 to perform control so as to receive that information from the portable terminal apparatus 3 through the first communication unit 27 (to perform information request to the portable terminal apparatus 3). The portable terminal apparatus 3 can indirectly recognize the result of the determination made by the orientation determination unit 15 by receiving this information request. Therefore, when the portable terminal apparatus 3 receives this information request, it returns information to be displayed in the first display unit 22. Further, the second display control unit 32 can make the second display unit 42 display the above-described operation image in response to this information request.

By displaying the above-described operation image, it is possible to operate the information to be displayed in the first display unit 22 (the information indicating the route guide in the example shown in FIG. 12) by using a hardware key provided in the portable terminal apparatus 3. However, it is desirable that the above-described operation image can be operated by a touch operation. Therefore, even in this embodiment, the portable terminal apparatus 3 preferably includes the second operation unit 43. Further, when the orientation determined by the orientation determination unit 15 is the first orientation, the second operation unit 43 receives a touch operation for the above-described operation image to be displayed in the second display unit 42.

In the example shown in FIG. 12, it is assumed that when the portable terminal apparatus 3 operates a navigation function on its own, it can display a setting menu for a route, a destination, etc. in addition to displaying the map (including displaying a route when the rout has already been set). Under this assumption, for example, when the portable terminal apparatus 3 operates the navigation function on its own, an image similar to the image displayed on the first display surface 22a shown in FIG. 5 is displayed in the second display unit 42. Note that instead of displaying the setting menu, an icon for activating the setting menu may be displayed.

By the above-described configuration, the portable terminal apparatus 3a placed in the information display apparatus 1 as shown in FIG. 12 can display a menu for operating the navigation function in the second display unit 42 in place of the map that is displayed under the above-described assumption. The operation menu is not limited to this example. It is also possible to reduce the display area of the map in the second display unit 42 and display the operation menu in a larger size in the space formed by the reduction. In this way, it is possible to separate the display in the portable terminal apparatus 3 (into the display of the map and the display of the operation menu in this example) just by placing the portable terminal apparatus 3 in the information display apparatus 1 for charging the portable terminal apparatus 3. Further, in this state, the second operation unit 43 can receive a touch operation for, for example, a navigation function on the second display surface 42a.

An example of a setting for a touch operation on the second display surface 42a of the portable terminal apparatus 3 will be described hereinafter. As shown in FIG. 12, when the orientation determined by the orientation determination unit 15 is the first orientation and an image has already been displayed in the second display unit 42, the second operation unit 43 directly receives a touch operation for the information displayed in the second display unit 42 in the first orientation state. Regarding this feature, generally speaking, since the portable terminal apparatus 3 may directly receive and process the touch operation, its description will be omitted.

On the other hand, as shown in FIG. 5 or 6, when the orientation determined by the orientation determination unit 15 is the first or second orientation and an image has already been displayed in the first display unit 22, the below-described control is performed for the touch operation on the second display surface 42a of the portable terminal apparatus 3. An example in which the information display apparatus 1 includes the below-described first operation control unit 13 will be described with reference to FIGS. 13 to 15. That is, the first operation control unit 13 controls an operation for information displayed in the first display unit 22 (i.e., performs a process for operating information displayed in the first display unit 22) irrespective of whether the displayed information is information based on the information display apparatus 1 or information based on the portable terminal apparatus 3. In particular, the first operation control unit 13 receives an operation performed in the second operation unit 43 of the portable terminal apparatus 3 irrespective of whether the information displayed in the first display unit 22 is information based on the portable terminal apparatus 3 or information based on the information display apparatus 1. In this way, it is possible to operate a GUI (Graphical User Interface) displayed in the first display unit 22 by using the second operation unit 43.

FIG. 13 shows coordinates on the display surface in the first display unit 22, and FIG. 14 shows an example of a setting for a touch operation when the portable terminal apparatus 3 is placed in the first orientation. Further, FIG. 15 shows an example of a setting for a touch operation when the portable terminal apparatus 3 is placed in the second orientation.

When the orientation determined by the orientation determination unit 15 is the first orientation, the first operation control unit 13 controls, as the above-described operation, a touch operation performed in the second operation unit 43 for information displayed in the first display unit 22 in the first orientation state. Note that by placing the portable terminal apparatus 3a oriented in the first orientation on the front panel 25 so that the second display surface 42a of the second display unit 42 faces upward, it is possible that the second operation unit 43 receives a touch operation preformed on the second display surface 42a based on the first orientation.

In this case, the information displayed in the first display unit 22 is information based on the portable terminal apparatus 3 as described above. The following description is given on the assumption that in the first display unit 22, information is displayed based on coordinates (x0 to x1 on the horizontal axis and y0 to y1 on the vertical axis) in the first display surface 22a as shown in FIG. 13. Note that an example in which the aspect ratio of the second operation unit 43 is equal to that of the first display surface 22a of the first display unit 22 is shown below. However, when these aspect ratios are different from each other, a range in the second operation unit 43 that conforms to the aspect ratio of the first display unit 22 may be used as an effective range.

For example, for the portable terminal apparatus 3a placed in the first orientation shown in FIG. 5, the first operation control unit 13 may enable touch operations performed in the second operation unit 43 in the first orientation. A touch operation performed in the second operation unit 43 in the first orientation may mean, for example, a touch operation based on the coordinates (x0 to x1 on the horizontal axis and y0 to y1 on the vertical axis) on the second display surface 42a shown in FIG. 14. Such a touch operation on the coordinates is processed as a touch operation performed for the corresponding coordinates on the first display surface 22a.

In order to enable a touch operation performed in the second operation unit 43, for example, the first operation control unit 13 may be configured so as to be able to receive information about the touch operation performed in the second operation unit 43 from the first communication unit 27 through the first communication control unit 17. In this case, the second operation unit 43 may also be maintained in an operable state. Note that when a touch operation based on the portable terminal apparatus 3 is enabled, a state in which a touch operation based on the first operation unit 23 is enabled may be maintained at the same time.

However, in the case where the touch operation performed in the second operation unit 43 is enabled, the first operation control unit 13 preferably disables the touch operation performed in the first operation unit 23 so that an operation in which a displayed image is hidden by a finger can be prevented from being performed. In particular, when the information display apparatus 1 is installed in an automobile, the above-described feature is preferred from the viewpoint of safety.

On the other hand, when the orientation determined by the orientation determination unit 15 is the second orientation, the first operation control unit 13 controls, as the above-described operation, a touch operation performed in the second operation unit 43 for information displayed in the first display unit 22 in the second orientation state. Note that by placing the portable terminal apparatus 3b oriented in the second orientation on the front panel 25 so that the second display surface 42a of the second display unit 42 faces upward, it is possible that the second operation unit 43 receives a touch operation preformed on the second display surface 42a based on the second orientation. In this case, the information displayed in the first display unit 22 is information based on the information display apparatus 1 as described in the first embodiment.

For example, for the portable terminal apparatus 3b placed in the second orientation shown in FIGS. 6, 10 and 11, the first operation control unit 13 may enable touch operations performed in the second operation unit 43 in the second orientation. A touch operation performed in the second operation unit 43 in the second orientation may mean, for example, a touch operation based on the coordinates (x0 to x1 on the horizontal axis and y0 to y1 on the vertical axis) on the second display surface 42a shown in FIG. 15. Such a touch operation on the coordinates is processed as a touch operation performed for the corresponding coordinates on the first display surface 22a.

An example in which when the first operation control unit 13 enables a touch operation performed in the second operation unit 43, it disables a touch operation performed in the first operation unit 23 has been described. In particular, the first operation control unit 13 preferably disables the touch operation performed in the first operation unit 23 when the orientation determined by the orientation determination unit 15 is the first orientation. That is, the first operation unit 23 preferably disables the touch operation performed on the first display surface 22a when the orientation determined by the orientation determination unit 15 is the first orientation.

On the other hand, in the case of the second orientation, since the information based on the information display apparatus 1 is displayed in the first display unit 22, the touch operation performed in the first operation unit 23 may be kept in the enabled state. This is because it is particularly useful for a user who is accustomed to touch operations in the first operation unit 23 in a state where information based on the information display apparatus 1 is displayed in the first display unit 22. As described above, the first operation unit 23 preferably receives a touch operation for information (information other than the aforementioned received information) displayed on the first display surface 22a when the orientation determined by the orientation determination unit 15 is the second orientation.

Next, an example of processes performed by the information display apparatus 1 according to this embodiment will be described with reference to FIG. 16 with particular emphasis on differences from the example of processes shown in FIG. 9. Therefore, the following description will be given based on the examples of displays shown in FIGS. 5 and 6. Note that steps S201-S206, S208 and S210-S213 in FIG. 16 are similar to the steps S101-S106, S107 and S108-S111 in FIG. 9, respectively.

The portable terminal apparatus 3 is placed in the information display apparatus and starts to be charged in the step S204, and the orientation of the portable terminal apparatus 3 is determined by the orientation determination unit 15 in the step S205. Then, when the determined orientation is the first orientation, the information based on the portable terminal apparatus 3a shown in FIG. 5 is displayed in the first display unit 22 in the step S206. After that (or before the step S206), the first operation control unit 13 enables a touch operation in the first orientation, i.e., a touch operation based on the portable terminal apparatus 3a in the first orientation (step S207). In this case, although the second operation unit 43 receives a touch operation, the second display control unit 32 turns off the display in the second display unit 42 under the control of the information display apparatus 1 or the like. Note that after the processes in the steps S206 and S207, the process in the step S210 is performed.

On the other hand, when the determined orientation is the second orientation, the information based on the information display apparatus 1 shown in FIG. 6 is displayed in the first display unit 22 in the step S208. After that (or before the step S208), the first operation control unit 13 enables a touch operation in the second orientation, i.e., a touch operation based on the portable terminal apparatus 3b in the second orientation (step S209). Even in this case, although the second operation unit 43 receives a touch operation, the second display control unit 32 turns off the display in the second display unit 42 under the control of the information display apparatus 1 or the like. Note that after the processes in the steps S208 and S209, the process in the step S210 is performed.

As described above, according to this embodiment, in addition to the effects achieved by the first embodiment, the information displayed in the first display unit 22 can be easily operated from the driver's seat side or the like. Further, since the image displayed in the first display unit 22 is not hidden by a user's own hand, the operation can be performed safely and easily. In particular, in the example shown in FIG. 12, since the operation menu can be separated and operated by a touch operation in the portable terminal apparatus 3a, the operation can be easily performed from the driver's seat side or the like.

OTHER EMBODIMENTS

Although the function of each part of the information display apparatus 1 shown in FIG. 1 has been described in each of the above-described embodiments, the only requirement is that these functions should be realized as those of the information display apparatus 1. Further, although the function of each part of the portable terminal apparatus 3 shown in FIG. 2 has been described in each embodiment, the only requirement is that these functions should be realized as those of the portable terminal apparatus 3. Note that each embodiment has been described on the assumption that the information display apparatus 1 and the portable terminal apparatus 3 communicate with each other by a wireless communication method. However, they may be connected to each other through a cable(s) though the connection may be more troublesome than the wireless communication method. Further, although it has been assumed that the information display apparatus 1 is installed in an automobile, the information display apparatus may be used in other places. Further, although the information display apparatus 1 has been described on the assumption that it includes an opening/closing mechanism that changes the state of the information display apparatus 1 between the first and second states, the information display apparatus 1 may include no opening/closing mechanism and may have such a shape that it is fixed in a state similar to the second state.

Figure 17:
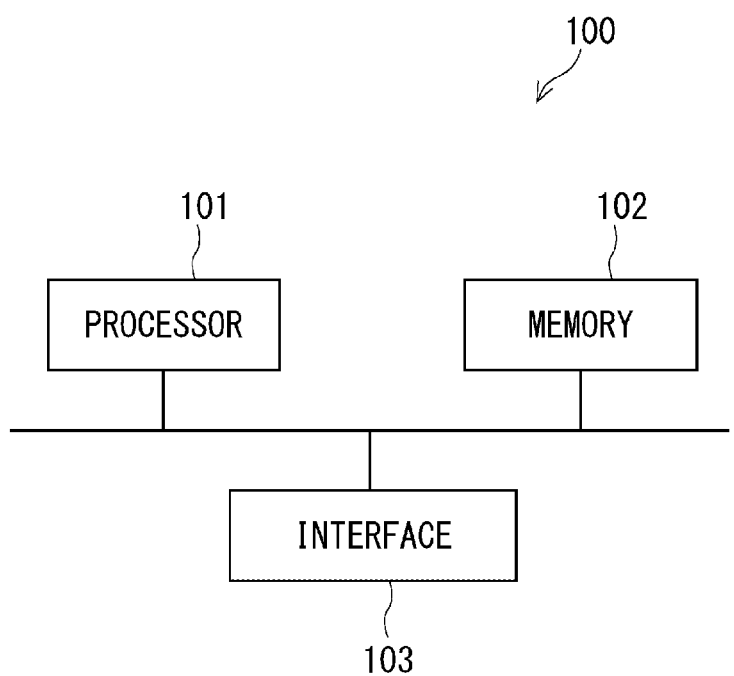
FIG. 17 shows an example of a hardware configuration included in an information display apparatus.

Further, the information display apparatus 1 according to each embodiment may include the following hardware configuration. FIG. 17 shows an example of a hardware configuration that may be included in the information display apparatus 1.

An information display apparatus 100 shown in FIG. 17 includes a processor 101 and a memory 102 as well as an interface 103 such as a communication interface and a user interface (a touch sensor or the like) (not shown). The control unit 10 described in each of the above-described embodiments is implemented by having the processor 101 load and execute a control program(s) stored in the memory 102. That is, this control program is a program for causing the processor 101 to function as the control unit 10 shown in FIG. 1. This control program is a program for causing the information display apparatus 1 shown in FIG. 1 to perform processes to be performed in the control unit 10. Note that the above description may also be applied to the portable terminal apparatus 3. Although its description is omitted, for example, the portable terminal apparatus 3 may include a processor 101 and a memory 102 as well as an interface 103 such as a communication interface and a user interface (a touch sensor or the like) (not shown).

The above-described program can be stored and provided to a computer (a computer including an apparatus) using any type of non-transitory computer readable media. The apparatus means an information display apparatus or a portable terminal apparatus. Non-transitory computer readable media include any type of tangible storage media. Examples of non-transitory computer readable media include magnetic storage media (such as floppy disks, magnetic tapes, hard disk drives, etc.), and optical magnetic storage media (e.g. magneto-optical disks). Further, the examples include CD-ROM (compact disc read only memory), CD-R (compact disc recordable), CD-R/W (compact disc rewritable). Further, the examples include semiconductor memories (such as mask ROM, PROM (programmable ROM), EPROM (erasable PROM), flash ROM, RAM (random access memory), etc.). Further, the program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Further, as described above for the procedures for the information display process and the charging process performed in the information display apparatus in the above-described various embodiments, the present disclosure may be applied in the form of a method for displaying information performed in an information display apparatus including a display unit and a placement part. The method for displaying information includes the below-described charging step, the determination step, and the displaying step. The charging step is a step of controlling a noncontact charging unit so as to perform a process for charging a portable terminal apparatus when the portable terminal apparatus is placed on the placement part. The determination step is a step of determining an orientation of the portable terminal apparatus placed on the placement part. The display step is a step of displaying information to be displayed on a first display unit while changing the information according to whether the determined orientation of the portable terminal apparatus is a first orientation or a second orientation different from the first orientation. Note that other examples are the same as those described in the above-described various embodiments. Further, the aforementioned control program may be a program for causing an information display apparatus (e.g., a control unit of an information display apparatus) to perform such a method for displaying information.

Note that the present disclosure is not limited to the above-described example embodiments and can be modified as appropriate without departing from the spirit and scope of the present disclosure. Further, the present disclosure may be implemented by combining these example embodiments as desired.

An information display apparatus, an information display system, an information display method, and a program according to an embodiment may be used for, for example, a vehicle or the like, and is capable of easily charging a portable terminal apparatus while displaying information therein and capable of easily selecting information to be displayed therein. Therefore, they are industrially applicable.

What is claimed is:

1. An information display apparatus comprising:
   a first display unit configured to display information;
   a placement part configured so that a portable terminal apparatus is placed thereon, the placement part comprising a noncontact charging unit configured to charge the portable terminal apparatus placed on the placement part;
   an orientation determination unit configured to determine an orientation of the portable terminal apparatus placed on the placement part;
   a first display control unit configured to control display of information in the first display unit; and
   a charging control unit configured to control charging of the portable terminal apparatus by the noncontact charging unit,
   wherein the charging control unit controls the noncontact charging unit so as to perform a process for charging the portable terminal apparatus when the portable terminal apparatus is placed on the placement part, and
   wherein the first display control unit makes the first display unit display video information received from the portable terminal apparatus when the orientation of the portable terminal apparatus determined by the orientation determination unit is a first orientation, and makes the first display unit display information other than the received video information when the orientation determined by the orientation determination unit is a second orientation different from the first orientation.

2. The information display apparatus according to claim 1, wherein the first display control unit makes the first display unit display video information related to a route guide received from the portable terminal apparatus when the orientation determined by the orientation determination unit is the first orientation, and makes the first display unit display an image for operating a content stored in the information display apparatus when the orientation determined by the orientation determination unit is the second orientation.

3. The information display apparatus according to claim 1, wherein the information display apparatus is an apparatus used in a vehicle,
   wherein the information display apparatus further comprises a vehicle information acquisition unit configured to acquire information related to the vehicle, and
   wherein, when the orientation determined by the orientation determination unit is the first orientation, the first display control unit makes the first display unit display video information related to a route guide received from the portable terminal apparatus, whereas when the orientation determined by the orientation determination unit is the second orientation, the first display control unit makes the first display unit display information related to the vehicle acquired by the vehicle information acquisition unit.

4. An information display system comprising the information display apparatus according to claim 1, and the portable terminal apparatus,
   wherein the portable terminal apparatus comprises a second display unit configured to display information, and a second display control unit configured to control display of information in the second display unit,
   wherein, when the orientation determined by the orientation determination unit is the first orientation, the first display control unit makes the first display unit display the video information received from the portable terminal apparatus, and
   wherein, when the orientation determined by the orientation determination unit is the first orientation, the second display control unit makes the second display unit display an operation image for operating the video information to be displayed in the first display unit in an orientation conforming to the orientation of the display in the first display unit.

5. The information display system according to claim 4, wherein the portable terminal apparatus comprises a second operation unit configured to receive a touch operation performed on a second display surface, the second display surface being a display surface of the second display unit, and wherein, when the orientation determined by the orientation determination unit is the first orientation, the second operation unit receives a touch operation for the operation image displayed in the second display unit.

6. The information display system according to claim 4, wherein the information display apparatus further comprises a first operation unit configured to receive a touch operation performed in a first display surface, the first display surface being a display surface of the first display unit, wherein the first operation unit disables a touch operation performed in the first display surface when the orientation determined by the orientation determination unit is the first orientation, and wherein the first operation unit receives a touch operation for information, displayed on the first display surface, other than the received video information when the orientation determined by the orientation determination unit is the second orientation.

7. A method for displaying information performed in an information display apparatus, the information display apparatus comprising:

a first display unit configured to display information; and a placement part configured so that a portable terminal apparatus is placed thereon, the placement part comprising a noncontact charging unit configured to charge the portable terminal apparatus placed on the placement part, the method comprising:

a step of controlling the noncontact charging unit so as to perform a process for charging the portable terminal apparatus when the portable terminal apparatus is placed on the placement part;

a step of determining an orientation of the portable terminal apparatus placed on the placement part; and a step of making the first display unit display video information received from the portable terminal apparatus when the determined orientation of the portable terminal apparatus is a first orientation, and making the first display unit display video information other than the received information when the determined orientation of the portable terminal apparatus is a second orientation different from the first orientation.

8. A non-transitory computer readable medium storing a program for a computer configured to operate an information display apparatus, the information display apparatus comprising:

a first display unit configured to display information; and a placement part configured so that a portable terminal apparatus is placed thereon, the placement part comprising a noncontact charging unit configured to charge the portable terminal apparatus placed on the placement part, the program being configured to cause the computer to perform:

a step of controlling the noncontact charging unit so as to perform a process for charging the portable terminal apparatus when the portable terminal apparatus is placed on the placement part;

a step of determining an orientation of the portable terminal apparatus placed on the placement part; and a step of making the first display unit display video information received from the portable terminal apparatus when the determined orientation of the portable terminal apparatus is a first orientation, and making the first display unit display information other than the received video information when the determined orientation of the portable terminal apparatus is a second orientation different from the first orientation.

* * * * *